United States Patent
Lin

(10) Patent No.: US 9,322,464 B2
(45) Date of Patent: Apr. 26, 2016

(54) HOLLOW DRIVE GEAR REDUCTION MECHANISM

(71) Applicant: Hiwin Technologies Corp., Taichung (TW)

(72) Inventor: Jian-An Lin, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 171 days.

(21) Appl. No.: 14/243,516

(22) Filed: Apr. 2, 2014

(65) Prior Publication Data
US 2015/0285355 A1 Oct. 8, 2015

(51) Int. Cl.
| F16H 33/00 | (2006.01) |
|---|---|
| F16H 35/00 | (2006.01) |
| F16H 37/00 | (2006.01) |
| F16H 49/00 | (2006.01) |
| B25J 19/00 | (2006.01) |

(52) U.S. Cl.
CPC ........... *F16H 49/001* (2013.01); *B25J 19/0025* (2013.01); *F16H 2049/003* (2013.01); *Y10T 74/19633* (2015.01)

(58) Field of Classification Search
CPC .. B25J 9/1025; B25J 19/0029; B25J 19/0025; F16H 55/0833; F16H 2049/003; F16H 2049/006; H02K 7/116
USPC .......................................................... 74/640
See application file for complete search history.

(56) References Cited

U.S. PATENT DOCUMENTS

| 2,943,465 | A | * | 7/1960 | Walton | F16D 1/12 464/160 |
|---|---|---|---|---|---|
| 4,742,729 | A | * | 5/1988 | Cordara | F16H 49/001 475/159 |
| 4,840,090 | A | * | 6/1989 | Iwata | B25J 9/1025 74/640 |
| 5,732,599 | A | * | 3/1998 | Iriyama | B25J 17/0241 74/490.02 |
| 5,937,710 | A | * | 8/1999 | Gould | F16H 35/008 74/640 |
| 2007/0039414 | A1 | * | 2/2007 | Takemura | F16H 49/001 74/640 |
| 2010/0319484 | A1 | * | 12/2010 | Kanai | F16H 55/0833 74/640 |

* cited by examiner

*Primary Examiner* — William Kelleher
*Assistant Examiner* — Jake Cook
(74) *Attorney, Agent, or Firm* — Wang Law Firm, Inc.

(57) ABSTRACT

A hollow drive gear reduction mechanism includes a hollow wave generator, an annular flexible bearing, a flexible wheel, and a rigid wheel. The annular flexible bearing is disposed in and driven to rotate by an elliptical recess of the wave generator. The flexible wheel includes an inner toothed section and is inserted in the annular flexible bearing and has an outer surface abutted against an inner surface of the inner ring, and the flexible wheel is driven to rotate by the annular flexible bearing. The rigid wheel includes a plurality of outer teeth which are different in number from the inner teeth of the flexible wheel, the rigid wheel is inserted in the flexible wheel, and a part of the outer teeth are meshed with the inner teeth. The respective components are hollow structures, and a lateral aperture is formed on the hollow wave generator.

5 Claims, 6 Drawing Sheets

HOLLOW DRIVE GEAR REDUCTION MECHANISM

BACKGROUND OF THE INVENTION

1. Field of the Invention

The present invention relates to a drive gear, and more particularly to a hollow drive gear reduction mechanism.

2. Description of the Prior Art

FIG. 1 shows a conventional harmonic drive gear reduction 10 which comprises a wave generator 11, a flexible spline 12 sleeved onto the wave generator 11, and a rigid spline 13 sleeved onto the flexible spline 12. The wave generator 11 comprises an elliptical cam 111 and flexible bearing 112 sleeved on the elliptical cam 111. The elliptical cam 111 is connected to and driven to rotate by a power source. When the elliptical cam 111 rotates, it will push against and make the flexible bearing 112 and the flexible spline 12 deform, and as a result, the teeth at different parts of the deformed flexible spline 12 will be engaged with the teeth of corresponding part of the rigid spline 13, furthermore, the flexible spline 12 has less teeth than the rigid spline 13, so that a rotation speed reduction is achieved. However, this drive gear reduction is a solid structure, and almost provides no room for wiring.

Hence, another hollow drive gear reduction 20 was developed as shown in FIGS. 2 and 3, and comprises a hollow base 21, a support member 22 is pivotally disposed in the hollow base 21, and a reduction wheel 23 sleeved onto the support member 22. Then, an output member 24 is fixed to the support member 22 to output power. A drive power source 25 is non-axially inserted in the hollow base 21 with respect to the support member 22, the reduction wheel 23 and the output member 24 and engaged with the reduction wheel 23, so that drive power is transmitted from the drive power source 25 to the output member 24 via the support member 22 and the reduction wheel 23, and then outputted from the output member 24, so rotation reduction is achieved, and the hollow base 21 provides room for wiring. However, the drive power source 25 is inserted deeply into the hollow base 21 and engaged with the reduction wheel 23 in a non-axial manner, and non-axial arrangement would not only increase the size of the whole drive gear reduction mechanism, but also make assembly more difficult. Furthermore, since the drive power source 25 uses a small toothed drive wheel to engage with and drive the reduction wheel 23 which is much larger than the small toothed drive wheel, backlash will appear between the drive power source 25 and the reduction wheel 23, which consequently will cause motion loss, angular motion error, and vibration. Hence, using toothed wheel as a drive wheel requires high machining and assembling accuracy, and increases manufacturing cost.

The present invention has arisen to mitigate and/or obviate the afore-described disadvantages.

SUMMARY OF THE INVENTION

The primary objective of the present invention is to provide a hollow drive gear reduction mechanism which is simply structured, easy to assemble, and convenient for wiring.

To achieve the above objective, a hollow drive gear reduction mechanism in accordance with the present invention comprises:

a hollow wave generator with a wave generating section formed at one end thereof, the wave generating section being formed with an elliptical recess;

an annular flexible bearing disposed in the elliptical recess of the wave generator in a manner that an outer surface of the outer ring is abutted against an inner surface of the elliptical recess, and the annular flexible bearing is driven to rotate by the elliptical recess;

a flexible wheel with an inner toothed section formed at one end thereof, the inner toothed section being provided on an inner surface thereof with a plurality of inner teeth, and the flexible wheel being inserted in the annular flexible bearing and having an outer surface abutted against an inner surface of the inner ring, and the flexible wheel being driven to rotate by the annular flexible bearing; and a rigid wheel provided on an outer surface with a plurality of outer teeth, and the outer teeth being different in number from the inner teeth of the flexible wheel, the rigid wheel being inserted in the flexible wheel in a manner that a part of the outer teeth are meshed with the inner teeth.

The respective components of the present invention are assembled together in a coaxial manner, which makes assembly easier and reduces assembly cost. Furthermore, the design that the respective components of the present invention are all hollow structures, and the lateral aperture is formed on the hollow wave generator, makes wiring easier.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
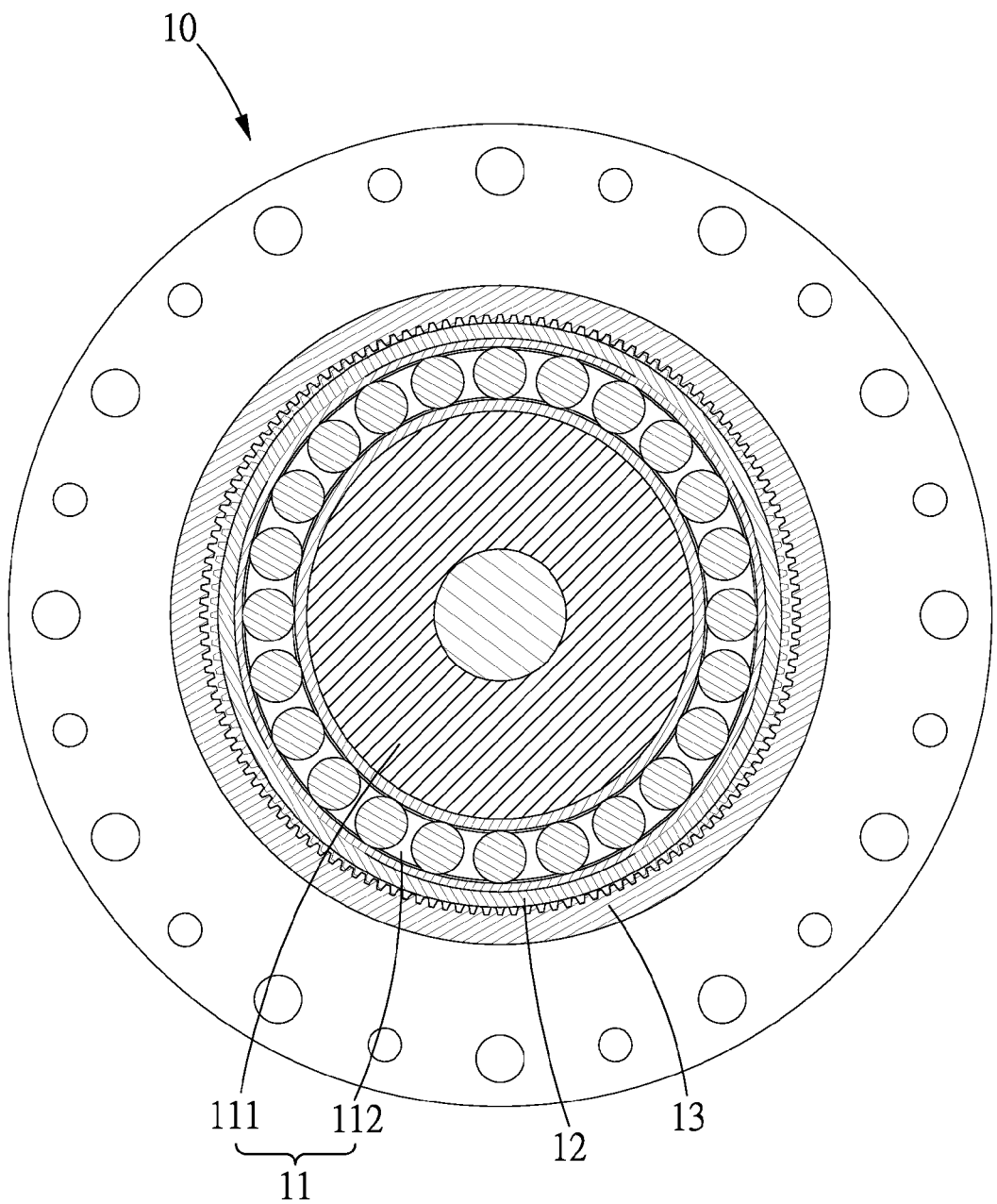
FIG. 1 is a cross sectional view of a conventional harmonic drive gear reduction.
Figure 2:
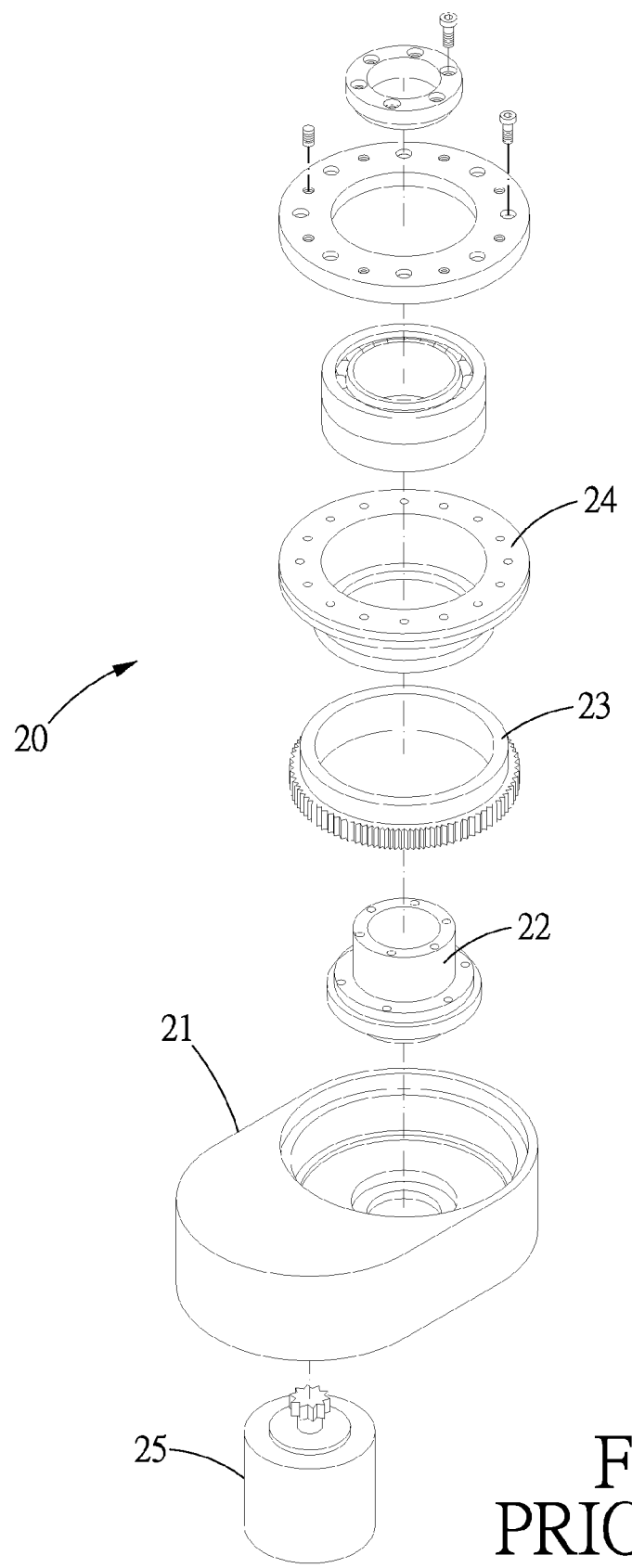
FIG. 2 is an exploded view of the conventional harmonic drive gear reduction.
Figure 3:
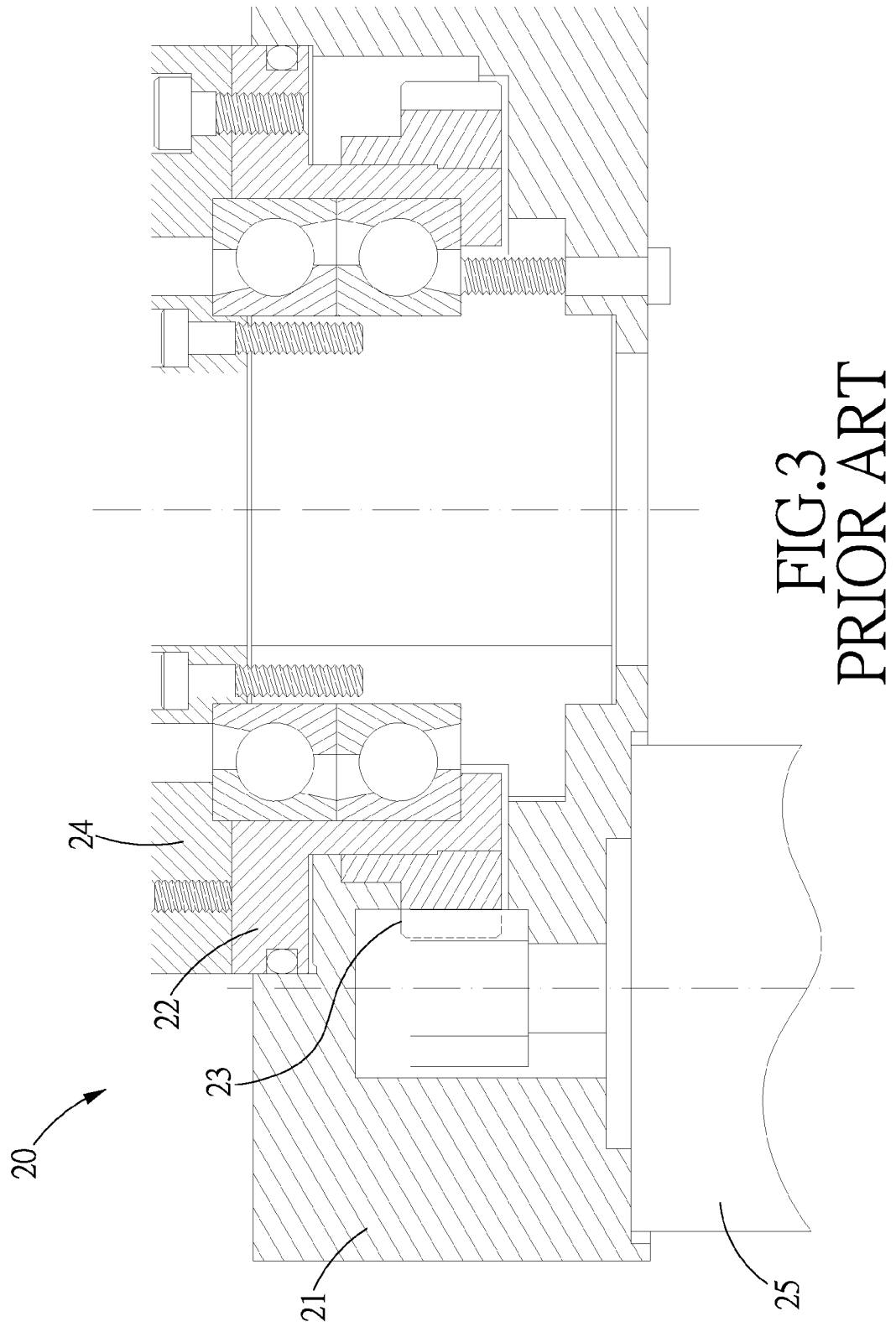
FIG. 3 is an assembly cross sectional view of the conventional harmonic drive gear reduction.
Figure 4:
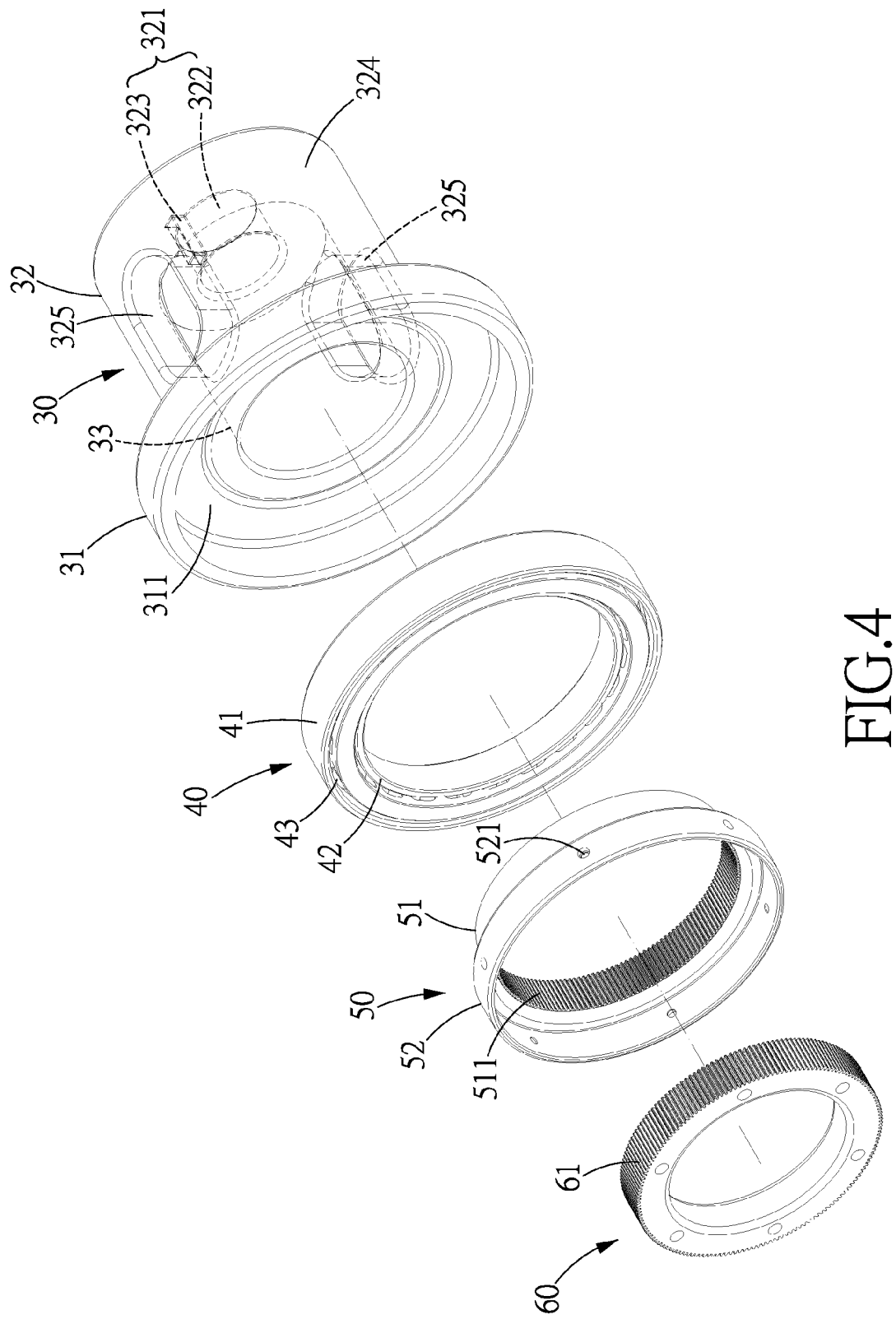
FIG. 4 is an exploded view of a hollow drive gear reduction mechanism in accordance with a preferred embodiment of the present invention.
Figure 5:
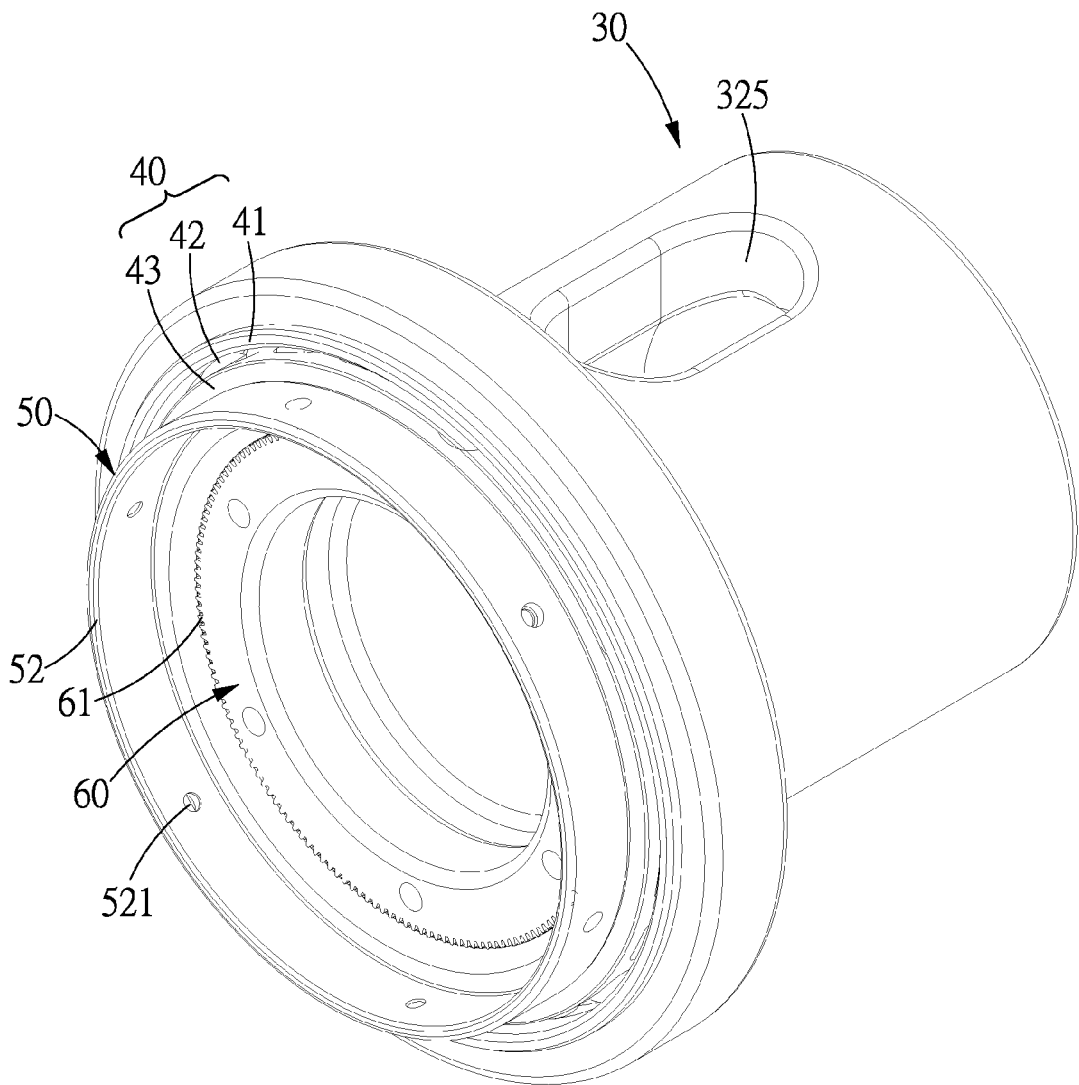
FIG. 5 is an assembly perspective view of the hollow drive gear reduction mechanism in accordance with the present invention.
Figure 6:
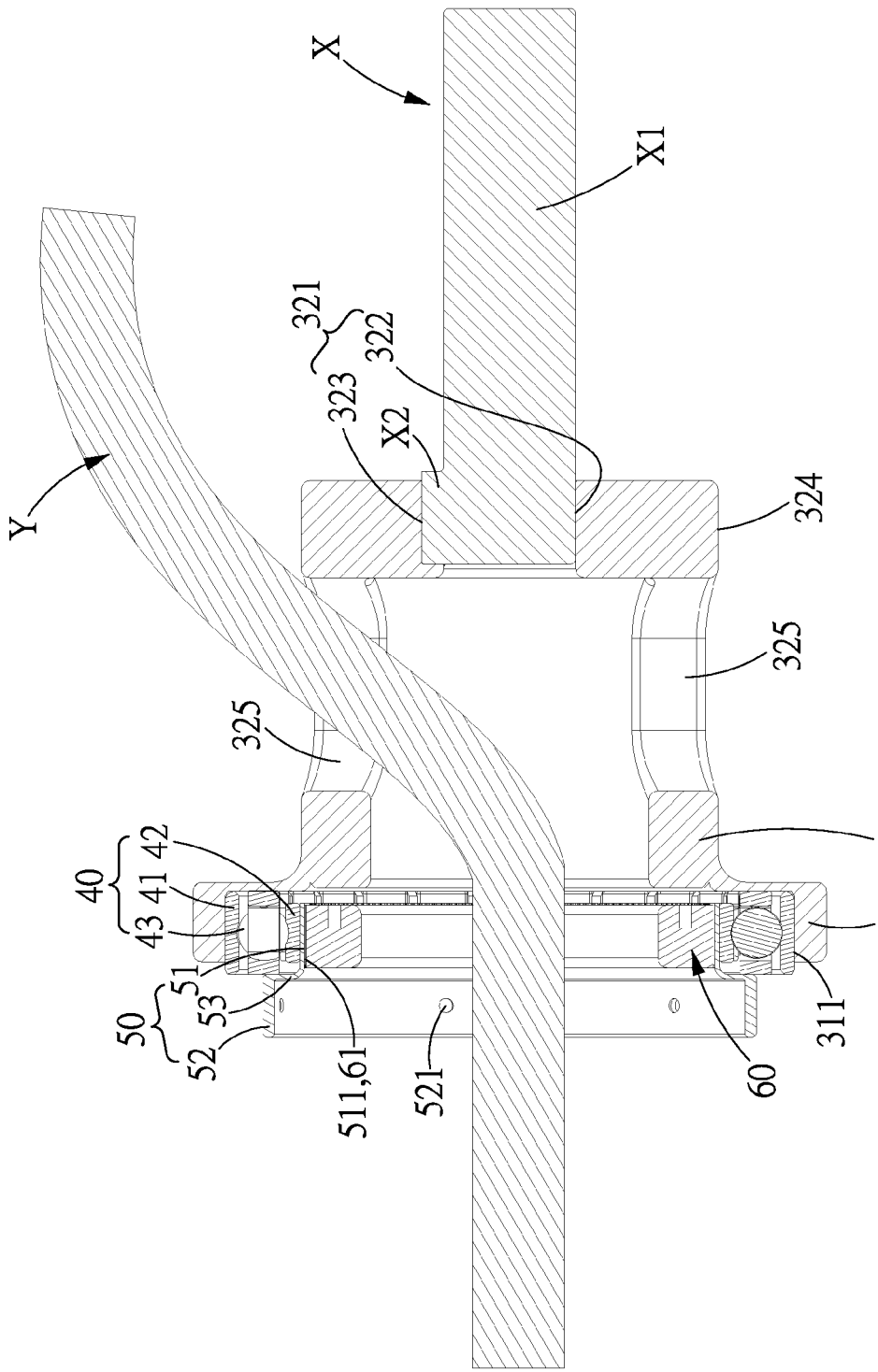
FIG. 6 is a cross sectional view of the hollow drive gear reduction mechanism in accordance with the present invention.

Referring to FIGS. 4-6, a hollow drive gear reduction mechanism in accordance with a preferred embodiment of the present invention is shown and comprises: a hollow wave generator 30, an annular flexible bearing 40, a flexible wheel 50, and a rigid wheel 60.

The hollow wave generator 30 has a wave generating section 31 formed at one end and a drive power input section 32 at another end thereof. The wave generating section 31 is formed with an elliptical recess 311 which is provided with an elliptical peripheral surface. The drive power input section 32 is formed with a drive power hole 321 which consists of a circular hole 322 and a spline groove 323. The hollow wave generator 30 is further provided with a hollow passage 33 which is in communication with the elliptical recess 311 and the circular hole 322. The hollow passage 33 and the circular hole 322 are formed at two ends of the hollow wave generator 30. The drive power input section 32 includes an outer peripheral surface 324 which is formed with at least one lateral aperture 325. In this embodiment, there are two lateral apertures 325 which are elliptical shaped.

The annular flexible bearing 40 includes an outer ring 41, an inner ring 42 inserted in the outer ring 41, and a plurality of rolling elements 43 movably disposed between the inner and outer ring 42, 41. A surface of the inner ring 42 opposite the outer ring 41 is defined as an inner surface of the annular flexible bearing 40, and a surface of the outer ring 41 opposite the inner ring 42 is defined as an outer surface of the annular flexible bearing 40. In this embodiment, the annular flexible bearing 40 is a ball bearing disposed in the elliptical recess 311 of the hollow wave generator 30 in such a manner that the outer surface of the outer ring 41 is abutted against the inner surface of the elliptical recess 311, and the annular flexible bearing 40 is driven to rotate by the elliptical recess 311.

The flexible wheel 50 includes an inner toothed section 51 formed at one end and an output section 52 formed at another end thereof. The inner toothed section 51 is provided on an inner surface thereof with a plurality of inner teeth 511, and the output section 52 is provided with a plurality of assembling apertures 521 for assembling of drive power output components. Between the inner toothed section 51 and the output section 52 is an annular abutting surface 53. The flexible wheel 50 is inserted in the annular flexible bearing 40 and abutted against the inner surface of the inner ring 42, so that the flexible wheel 50 is driven to rotate by the annular flexible bearing 40, and the annular abutting surface 53 of the flexible wheel 50 is abutted against the annular flexible bearing 40.

The rigid wheel 60 is provided on an outer surface with a plurality of outer teeth 61, and the number of the outer teeth 61 is different from the inner teeth 511 of the flexible wheel 50. The rigid wheel 60 is provided for fixing components and inserted in the flexible wheel 50 in such a manner that a part of the outer teeth 61 are meshed with the inner teeth 511.

When in use, the rigid wheel 60 must be fixed, then the flexible wheel 50 is sleeved onto the rigid wheel 60 to make the inner toothed section 51 engage with the outer teeth 61. Then the annular flexible bearing 40 is inserted in the elliptical recess 311 of the hollow wave generator 30, so that the annular flexible bearing 40 is also deformed into an elliptical shape, then the hollow wave generator 30 together with the annular flexible bearing 40 is sleeved onto the inner toothed section 51 of the flexible wheel 50, so that the assembly of the hollow drive gear reduction mechanism in accordance with the present invention is finished. The assembling apertures 521 allow the flexible wheel 50 to be fixed to drive power output components, so that the flexible wheel 50 can be served as an drive power output end of the hollow drive gear reduction mechanism of the present invention. In this embodiment, the assembling holes 521 are countersunk holes, so as to prevent interference of fasteners engaged in the assembling holes 521 with other components. The drive power hole 321 allows the drive power input section 32 of the hollow wave generator 30 to be fixed to a drive shaft X of the drive power source. The drive shaft X includes a cylindrical shaft X1 and an anti-rotation spline X2 which are inserted into the circular hole 322 and the spline groove 323 of the drive power hole 321, respectively, so that drive power can be transmitted from the drive shaft X of the drive power source to the drive power input section 32 to rotate the hollow wave generator 30. The wiring Y of the hollow drive gear reduction mechanism of the present invention can be inserted through the annular rigid wheel 60, the flexible wheel 50, the annular flexible bearing 40 and into the hollow passage 33, and finally inserted out of the lateral aperture 325 of the hollow wave generator 30. The lateral aperture 325 has an elliptical shape providing more room of wiring. It is to be noted that the hollow drive gear reduction mechanism of the present invention is particularly suitable for use in the mechanical arm with a 150-250 degree freedom of movement, and can also be used on a mechanical arm with more freedom of movement, when provided with an extra rotary adaptor.

When in use, the drive shaft X drives the hollow wave generator 30 to rotate, then the hollow wave generator 30 rotates the annular flexible bearing 40 and the flexible wheel 50. Since the number of the outer teeth 61 is different from the number of the inner teeth 511 of the flexible wheel 50, a rotation speed reduction is achieved.

It is learned from the above description that the rotation speed reduction can be achieved with simple structure of the hollow drive gear reduction mechanism of the present invention. In addition to low cost of the simple structure, the respective components of the present invention are assembled together in a coaxial manner, which further reduces assembly cost. Furthermore, the design of the respective components of the present invention being all hollow structures, plus the lateral aperture of the hollow wave generator 30 makes wiring easier.

While we have shown and described various embodiments in accordance with the present invention, it is clear to those skilled in the art that further embodiments may be made without departing from the scope of the present invention.

What is claimed is:

1. A hollow drive gear reduction mechanism comprising:
a hollow wave generator with a wave generating section formed at one end thereof, the wave generating section being formed with an elliptical recess;
an annular flexible bearing including an outer ring and an inner ring inserted in the outer ring, and being disposed in the elliptical recess of the wave generator in a manner that an outer surface of the outer ring is abutted against an inner surface of the elliptical recess, and the annular flexible bearing is driven to rotate by the elliptical recess;
a flexible wheel with an inner toothed section formed at one end thereof, the inner toothed section being provided on an inner surface thereof with a plurality of inner teeth, and the flexible wheel being inserted in the annular flexible bearing and having an outer surface abutted against an inner surface of the inner ring, and the flexible wheel being driven to rotate by the annular flexible bearing; and
a rigid wheel provided on an outer surface with a plurality of outer teeth, and the outer teeth being different in number from the inner teeth of the flexible wheel, the rigid wheel being inserted in the flexible wheel in a manner that a part of the outer teeth are meshed with the inner teeth;
wherein the hollow wave generator has a drive power input section formed at another end thereof, the drive power input section is formed with a drive power hole for connecting to a drive power source, and the hollow wave generator is further provided with a hollow passage which is in communication with the elliptical recess, and the drive power input section includes an outer peripheral surface which is formed with at least one lateral aperture.

2. The hollow drive gear reduction mechanism as claimed in claim 1, wherein the hollow wave generator has a drive power input section formed at another end thereof, the drive power input section is formed with a drive power hole for connecting to a drive power source.

3. The hollow drive gear reduction mechanism as claimed in claim 1, wherein the annular flexible bearing includes a plurality of rolling elements movably disposed between the inner and outer rings, a surface of the inner ring opposite the outer ring is defined as an inner surface of the annular flexible bearing, a surface of the outer ring opposite the inner ring is defined as an outer surface of the annular flexible bearing, and an outer surface of the outer ring is abutted against an inner surface of the inner ring.

4. The hollow drive gear reduction mechanism as claimed in claim 1, wherein the flexible wheel includes an output section formed at another end thereof, and the output section is provided with a plurality of assembling apertures.

5. The hollow drive gear reduction mechanism as claimed in claim 1, wherein the flexible wheel includes an output section formed at another end thereof, between the inner toothed section and the output section is an annular abutting surface which is abutted against the annular flexible bearing.

* * * * *